INVENTOR.
Joe H. Wood

Patented Feb. 6, 1951

2,540,562

UNITED STATES PATENT OFFICE 2,540,562

ELECTRIC GATE

Joe H. Wood, Ponchatoula, La.

Application June 2, 1947, Serial No. 751,805

1 Claim. (Cl. 39—84)

My present invention relates generally to electrically charged fences, and more specifically to an improved electric gate of the double, or sectionally hinged and mechanically operated, spring-closed type, and especially designed to form an electrically charged barrier in an electrically charged farm fence. The twin gate or double gate of my invention is adapted to be opened by frictional engagement of an advancing automotive vehicle, and the twin gates are automatically, or spring-closed after passage of the vehicle, to restore the electrically charged fence to normal operative condition. When in closed position the twin gates form a continuation of the electrically charged fence for confining cattle and other live stock, as well as for preventing entrance of the animals to the fenced-in area or farm.

The invention consists in certain novel features of construction and combinations and arrangements of parts in an electric gate of the twin type as will hereinafter be described and more specifically set forth in the appended claim.

In the accompanying drawings I have illustrated one complete example of a physical embodiment of my invention wherein the parts are combined and arranged in accord with a mode I have so far devised for the practical application of the principles of my invention. It will, however, be understood that changes and alterations are contemplated and may be made in these exemplifying drawings, mechanical structures, and electrical appliances, within the scope of my claim, without departing from the principles of the invention.

Figure 1:
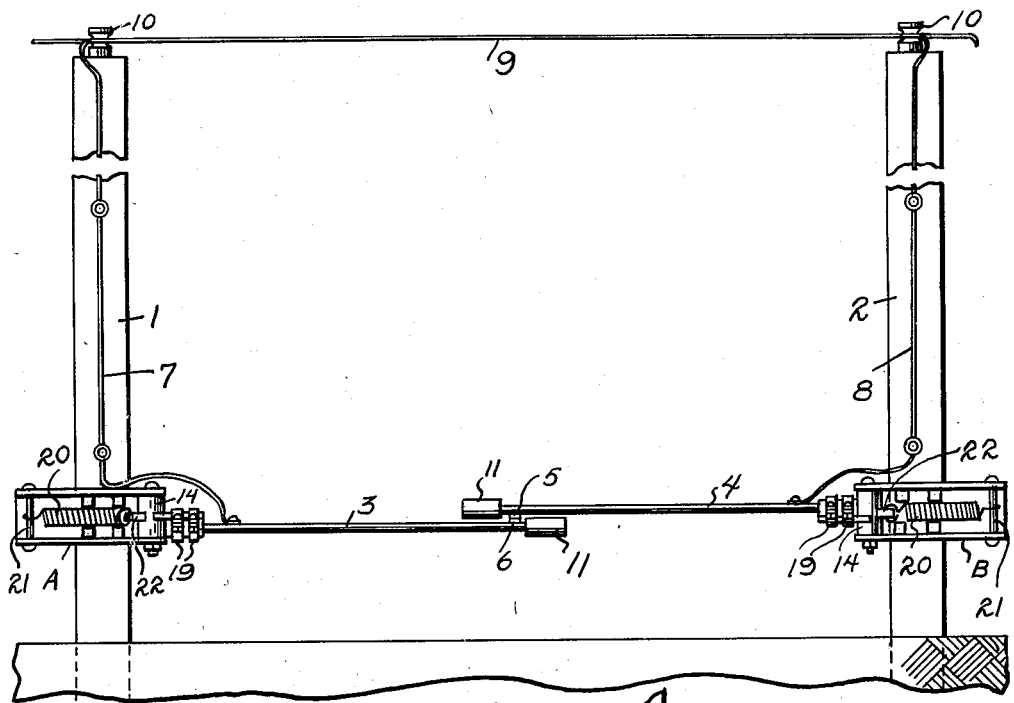
Figure 1 is a view in elevation of a twin-gate structure in which my invention is embodied.
Figure 3:
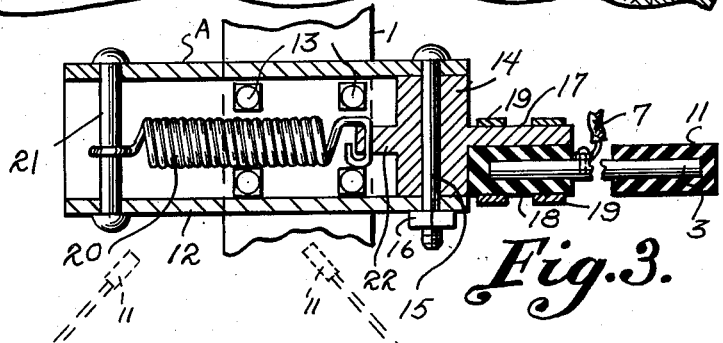
Figure 3 is an enlarged detail sectional view of one of the duplicate hinge-structures.

In carrying out my invention the gateway is provided with two conventional posts 1 and 2, and the twin gates each includes a horizontally disposed rod as 3 and 4 of spring steel or other suitable material that is a conductor of electricity.

The two conductor rods near their overlapping inner ends are provided with electric contacts 5 and 6, in a shunted circuit that includes branch electric wires 7 and 8 mounted on the posts 1 and 2, and these branch wires are connected to the main conductor 9 of an electrically charged fence. The conductor 9 is mounted on insulators 10, 10, of the posts at such a height as to permit passage through the gateway of automotive vehicles, and pedestrians, and the rods of the gates are elevated above the ground line to provide an effective barrier for the gateway. The electrically charged rods of the gates are also effective in excluding cattle and live stock from passage through the gateway.

The twin gates are designed to be opened by a push from an advancing automotive vehicle and for this purpose the overlapping inner ends of the rods are equipped with pads or cushions 11, 11, of rubber or other resilient, electrically insulated material. The cushions, in the form of cylindrical heads or sleeves, provide smooth and non-scratching contacts for frictional engagement with the advancing vehicle, and under some circumstances, these rubber heads may be employed as handles for manually opening the twin gates.

Each rod 3, 4, at its outer end is mounted upon a hinge structure, as A and B, mounted upon the respective posts 1 and 2, and inasmuch as these complementary structures are identical a description of one will suffice for both of the twin gates.

The hinge structure includes a horizontally disposed channel shaped bracket 12 that is bolted at 13 to a post, and the fixed channel bracket, between its upper and lower flanges, supports a vertically arranged hinge 14 pivoted on a hinge bolt 15 that is equipped with a lock nut 16. At its inner side the hinge 14 is equipped with an integral housing 17 that encases an insulating sleeve 18 on the outer end of the rod, and the sleeve and housing are clamped together by bolted bands 19 for a rigid joint between the rod and the hinge.

After being forced open by a push from the vehicle the gate is returned to closed position, and swung on its hinge by means of a spring as 20 located within the channel bracket, with one end anchored to a vertically disposed bolt 21 mounted in the bracket, and its other end attached to a perforated ear or lug 22 integral with and forming an extension of the hinge 14.

Figure 2:
Figure 2 is a top plan view of the gate structure, showing by dotted lines the twin gates partially opened.

From this description taken in connection with my drawings it will be apparent that the twin gate may be pushed open by a vehicle, as indicated by dotted lines in Fig. 2, and after passage of the vehicle, the springs automatically return the gates to closed position. While the gates are open the shunt circuit through the rods is broken, but the main charging circuit of the fence remains closed; and of course after the twin gates swing to closed position the shunt circuit is again closed for effective use.

Having thus fully described my invention, what I claim as new and desire to secure by Letters Patent is:

In an electric gate, the combination of spaced posts, a pair of twin gates and each gate comprising an electrically-conductive rod, said gates being associated with each post so that each rod extends towards and mutually overlaps each other, electric contacts on the overlapped portions of said rods adapted to abut each other, a bracket on each post, bolts on opposite ends of each bracket, a hinge pivoted on one bolt of each bracket, a lug extending from each hinge, a spring anchored to each lug and the remaining bolt of each bracket whereby said rods are yieldably held in a common plane with said electric contacts touching, insulating means on said hinges supporting said rods and the outer end of each rod, respectively, and means for electrically energizing said rods.

JOE H. WOOD.

REFERENCES CITED

The following references are of record in the file of this patent:

UNITED STATES PATENTS

| Number | Name | Date |
| --- | --- | --- |
| 343,939 | Wilson | June 15, 1886 |
| 448,456 | Ruge | Mar. 17, 1891 |
| 1,331,836 | Wilbanks | Feb. 24, 1920 |
| 1,471,830 | Corey | Oct. 23, 1923 |
| 2,376,630 | Stentz | May 22, 1945 |

FOREIGN PATENTS

| Number | Country | Date |
| --- | --- | --- |
| 25,650 | Great Britain | Oct. 16, 1897 |
| 226,152 | Germany | Mar. 15, 1910 |
| 116,688 | Australia | Mar. 18, 1943 |

OTHER REFERENCES

Publication—"Popular Mechanics," vol. 70, published September 1938, pages 419 and 130 A; article entitled "Operate This Electric Fence Controller." Copy in Division 1; 256—10.